United States Patent
Dollinger

(10) Patent No.: US 6,317,072 B1
(45) Date of Patent: Nov. 13, 2001

(54) MULTIPLE SOURCE JAMMING SIGNAL CANCELLATION SYSTEM

(75) Inventor: Kenneth Dollinger, Nashua, NH (US)

(73) Assignee: BAE Systems Information and Electronic Systems Integration, Inc.

( * ) Notice: Subject to any disclaimer, the term of this patent is extended or adjusted under 35 U.S.C. 154(b) by 0 days.

(21) Appl. No.: 05/694,130

(22) Filed: Jun. 3, 1976

(51) Int. Cl.[7] ............................... G01S 7/36; G01S 7/42; H04K 3/00
(52) U.S. Cl. .................... 342/16; 342/17; 342/19
(58) Field of Search ............. 343/18 E; 342/16, 342/17, 19

(56) References Cited

U.S. PATENT DOCUMENTS

| | | | |
|---|---|---|---|
| 3,195,130 | * 7/1965 | Adrian | 343/18 E |
| 3,689,922 | * 9/1972 | Phillips, Jr. | 343/18 E X |
| 3,887,919 | * 6/1975 | Christensen et al. | 343/18 E |

* cited by examiner

Primary Examiner—Theodore M. Blum
(74) Attorney, Agent, or Firm—Vernon C. Maine; Scott J. Asmus

(57) ABSTRACT

In a jamming cancellation system wherein a balanced modulator receives as two inputs thereto: the desired plus jamming signals, and the AM difference frequency produced by the beating of the desired and jamming signals, jamming suppression, in an environment containing two jamming signals, is achieved by peak detecting the output from the AM difference frequency producing means and applying same directly to the receiver video input or upconverting same to the receiver r.f. frequency and applying same to the system receiver.

12 Claims, 2 Drawing Sheets

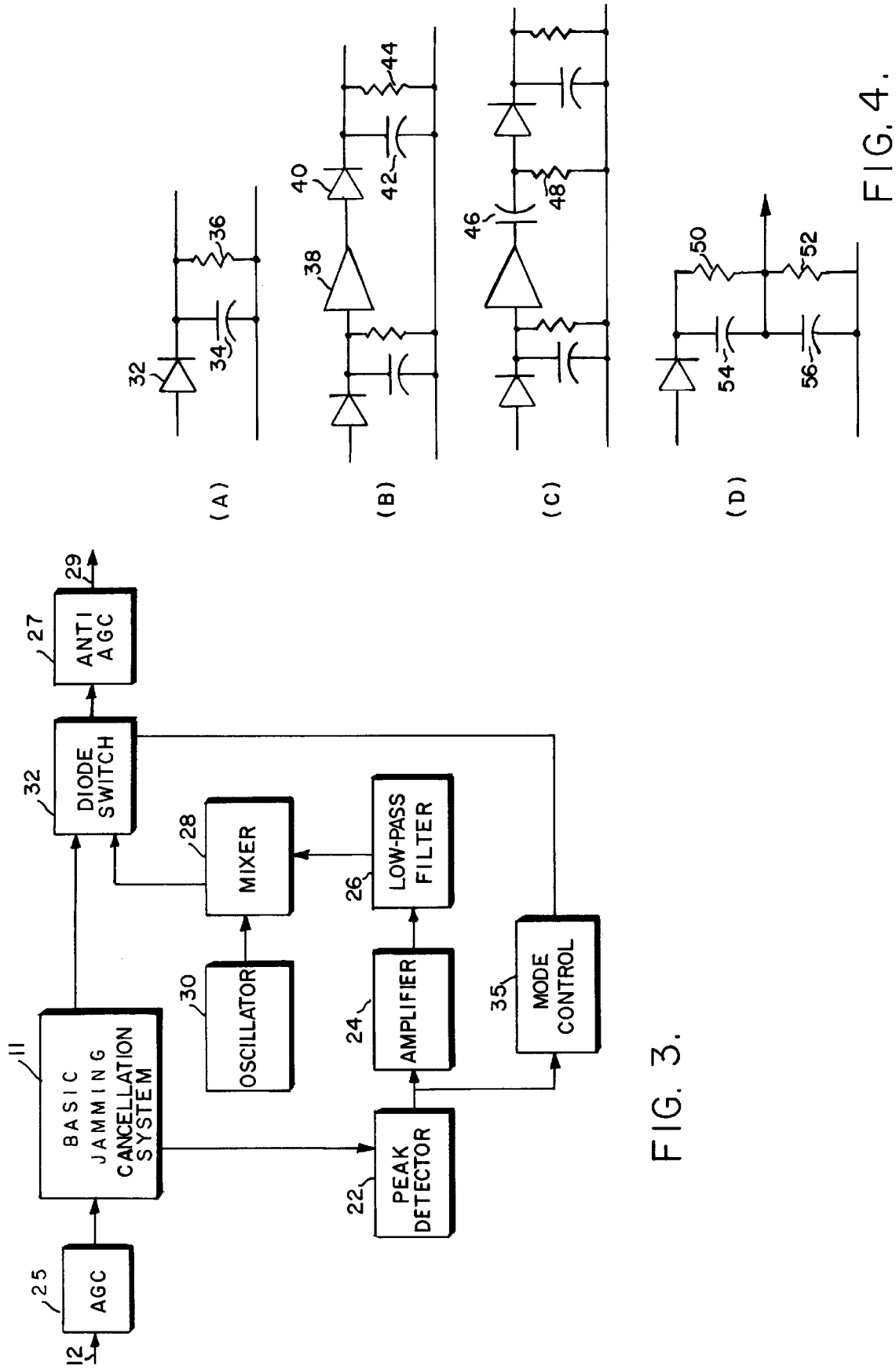

MULTIPLE SOURCE JAMMING SIGNAL CANCELLATION SYSTEM

BACKGROUND OF THE INVENTION

This invention relates to a jamming cancellation system and more particularly to a multiple source jamming cancellation system.

An important consideration in the design of electronic systems such as radar, particularly those for military applications, is the provision of means for recovering the desired signal from a total signal which include noise jamming signals fo higher intensity than that of the desired signal itself. Most noise jammers consist fo an oscillator which is frequency modulated by a noise waveform at a high rate. The rates are high enough to shock excite the victor radar i.f. amplifier so that its output is indistinguishable from true random noise.

Various techniques to cancel jamming signals and thus recover the desired signal have been proposed. One such technique is described in a patent application for a "Jamming Signal Cancellation System", Ser. No. 509,158, filed Sep. 24, 1974 and assigned to the assignee of the present invention.

In that application improved signal detection is achieved by detecting the AM difference frequency produced by the beating of the desired signal with the jamming signal and applying same to one input of a balanced modulator while simultaneously applying the received signal (containing both the desired signal and the jamming signal) to the other input of the balanced modulator whereby the output from the balanced modulator contains the desired signal but not the jamming signal. Actually, the video signal applied to the balanced modulator causes double-sideband suppressed-carrier modulation of the jamming signal. As a result the balanced modulator output contains two frequencies: one is the desired signal; the other is an image on the other side of the jamming frequency and frequency modulated with twice the deviation of the jammer. The image is outside the passband of the receiver and thus, only the desired signal is processed.

This single stage device only removed the strongest jammer signal. If a weaker jammer signal is also present it is preserved in its original ratio to the desired signal. Therefore, the apparent improvement factor can never exceed the ratio of the tow jammer powers and generally is a few db less.

A solution to this problem of multiple jammers is disclosed in U.S. patent application User. No. 589,490, filed Jun. 16, 1975 for "Multiple Source Jamming Signal Cancellation Systems" and assigned to the assignee of the present application. In that application suppression of jamming from multiple sources is achieved by detecting the AM difference frequency produced by the beating of a desired signal and the smaller of the multiple jamming signals with the stronger jamming signals and applying same to one input of a single-sideband modulator while simultaneously applying the received signal (containing both the desired signal and the jamming signals) to the other input to the single-sideband modulator whereby the larger jamming signal is suppressed. The sum and difference outputs of the single-sideband modulator containing the upper and lower sidebands, respectively, of the desired signal plus the smaller jamming signal are each processed by a jamming cancellation circuit to suppress the smaller jamming signal and their outputs combined to receive the desired signal. While this system performs adequately it does require that the multiple jamming signals be of different power levels and degradation of the system occurs as the relative power levels of the multiple jamming signals approach unity.

SUMMARY OF THE INVENTION

Accordingly, it is an object of this invention to provide improved means for reducing the effects of noise jamming.

It is another object of this invention to provide improved signal detection performance in a jamming environment.

It is a further object of this invention it provide means for reducing the effects of multiple jammers on signal detection.

It is yet another object of this invention to provide means for reducing the effect of multiple jammers on signal detection even in the presence of multiple jammers having substantially equal power.

Briefly, in one embodiment the signal received at an antenna, which consists of a desired signal and one or two jamming signals is split into two channels. One channel includes an AM Detector, a high-pass filter and a video amplifier. The AM detector detects the difference frequencies produced by the beating of the desired signal and the one or two jamming signals. The other channel may include a delay line.

The outputs from the delay line and video amplifier are coupled to the two inputs to a balanced modulator. The output form the video amplifier is also coupled to a channel consisting of a peak detector, amplifier and low-pass filter. The output of the low-pass filter is applied to a mixer having an r.f. oscillator coupled to the other input thereto.

The outputs from the mixer and balance modulator are applied to a switching circuit for switching one of the mixer and balanced modulator outputs to a receiver. If one jammer is present the balanced modulator output is applied to the receiver while if two jammers are present the output of the mixer is applied to the receiver.

The switching circuit is controlled by a mode control circuit which measures whether the output of the peak detector exceeds a threshold indicating the presence of two jammers and, thus, switches to the receiver the output of the mixer.

BRIEF DESCRIPTION OF THE DRAWINGS

The above-mentioned and other features and objects of this invention will become more apparent by reference to the following description taken in conjunction with the accompanying drawings, in which:

FIG. 3 is a block diagram of an alternate embodiment of a multiple source jamming cancellation system; and FIGS. 4A–4D are a series of schematic diagrams of representative peak detector circuits employed in the systems of FIGS. 1 and 3.

DESCRIPTION OF PREFERRED EMBODIMENTS

Figure 1:
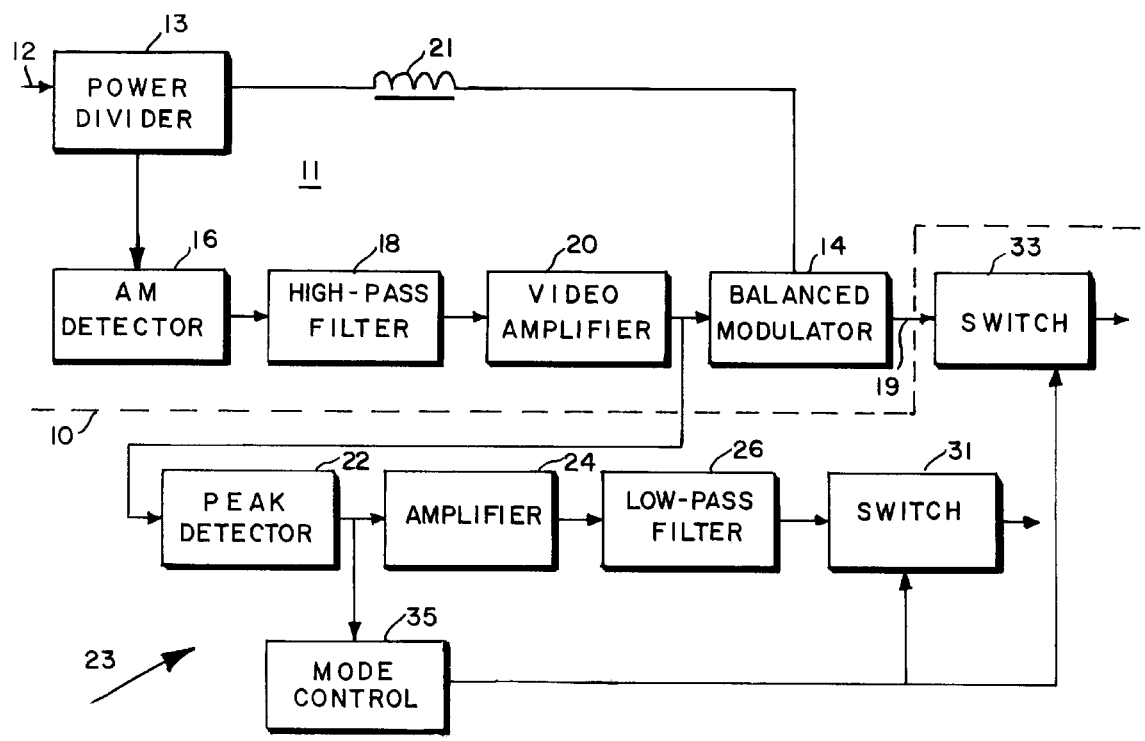
FIG. 1 is a block diagram of a multiple source jamming cancellation system.

Referring now to FIG. 1 of the drawings, there is illustrated thereby above the dashed line 10 a jamming signal cancellation system 11 as set forth is said U.S. patent application Ser. No. 509,158. In that system an input signal 12 containing both a desired signal and a jamming signal of higher intensity is split into two paths by a power divider 13.

One path drives a balanced modulator 14, the other an AM detector 16. The desired signal and jamming signal beat together producing AM at the difference frequency. This AM is detected by AM detector 16 and applied to the other input of balanced modulator 14 via a high-pass filter 18 and video amplifier 20. This video signal applied to balanced modulator 14 causes double-sideband suppressed-carrier modulation of the jamming signal. As a result the balanced modulator output 19 contains two frequencies: one is the desired signal; the other is an image on the other side of the jamming frequency and frequency modulated with twice the deviation of the jammer.

High-pass filter 18 blocks d.c. such that the jamming signal cannot push itself through. The r.f. input to the balanced modulator 14 is the strong signal which switches the diodes; the video input is the weak signal which controls the output amplitude (and polarity). As set forth in the aforementioned patent application (and as shown in FIG. 3 by circuit 25) AGC may also be used to restrict the dynamic range of signal presented to the balanced modulator in order to permit a better balance to be maintained. Also, an auto-AGC circuit (circuit 27 of FIG. 3) can be provided at the output of the balanced modulator 14 to cancel the gain variations introduced by the AGC in order to restore the antenna modulation of a target. A delay line 21 is also provided to compensate for the delay in the video amplifier.

If it is expected that the hammers to be handled will have AM thereon then high-pass filter 18 should cut off at roughly the AM frequencies. This may cause some loss of the desired signal since whenever the beat frequency is below the filter cutoff the signal will not get through. However, for typical practical parameters this loss will be small.

In practice an automatic mode control should be provided to monitor the level of jamming (d.c. at detector 16) such that below a predetermined threshold level a d.c. bias be applied to the balanced modulator, thus, in effect, by passing the jamming cancellation system. This would be used to prevent loss of the desired signal in the absence of jamming.

Figure 2:
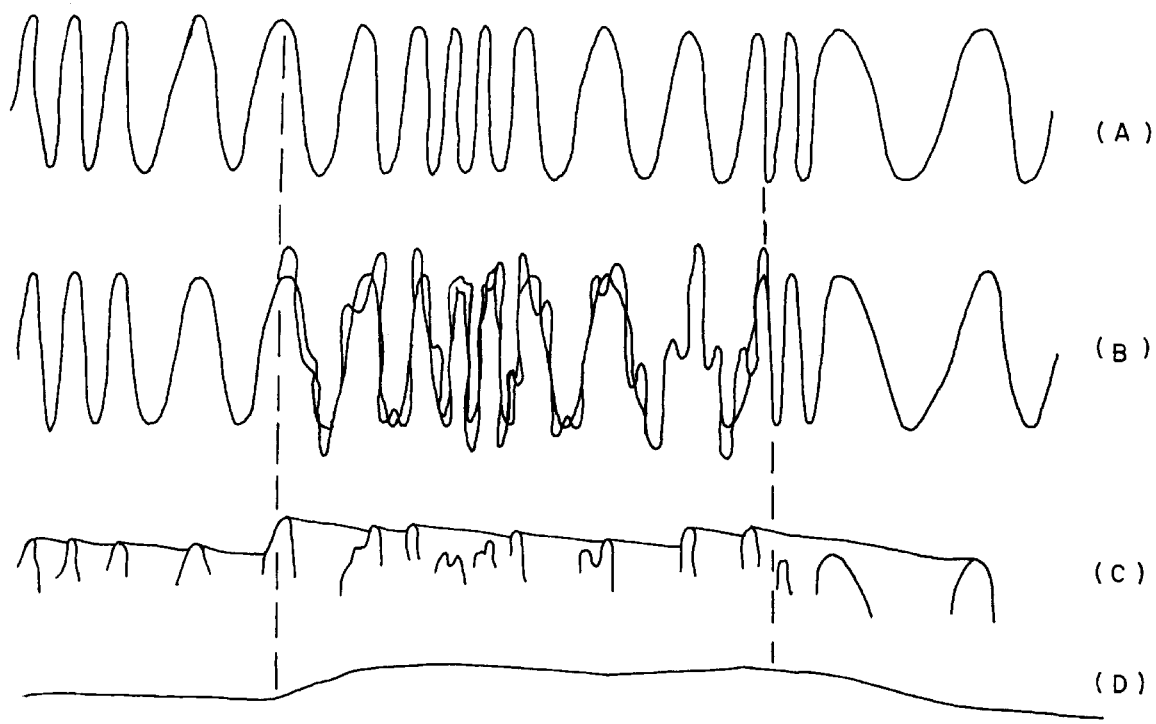
FIGS 2A–2D are a series of waveforms illustrating operation of the multiple source jamming cancellation system.

The jamming cancellation system 11 of FIG. 1 described above removes the strongest jamming signal only. If a weaker jamming signal is present, it is preserved in its original ratio to the desired signal. Therefore, the apparent improvement factor can never exceed the ratio of the two jammer powers and if two equal or nearly equal jammer powers are used there is no improvement provided by the system. When two jammers are present their beat frequency will appear in the video of system 11 of FIG. 1 described above as shown by waveform (A) of FIG. 2. For tutorial purposes it is assumed that neither jammer has AM so that the amplitude of the beat is constant. When a signal pulse is added it will appear as shown in waveform (B) of FIG. 2.

Under these conditions an additional mode 23 is employed to recover the desired signal. This is shown below the dashed line 10 of FIG. 1. The output of video amplifier 20 of the basic jamming cancellation system is applied to a peak detector 22. The output of peak detector 22 will appear as shown in waveform (C) of FIG. 2. Note that most of the energy at the beat frequency has disappeared but the rise in peak voltage due to the signal is preserved. This signal is amplified by an amplifier 24 and further filtered by a low-pass filter 26 matched to the radar pulse to yield an output as shown by waveform (D) of FIG. 2. The output from low-pass filter 26 is applied directly to the radar display via a switch 31. The output from balanced modulator 14 is disabled for this mode by a switch 33.

Switch 33 is opened and switch 31 closed in the event of detection of two jammers. This is accomplished by a mode control circuit 35. If only one jammer is present the output of video amplifier 20 is a d.c. voltage and, thus, the output of peak detector 22 will be zero. If two jammers are preset, the beat between the two is detected by peak detector 22. This d.c. voltage is applied to mode control circuit 35 which detects a threshold being exceeded and operates switched 31 and 33.

In this mode the system is a noncoherent system such that the basic radar sensitivity will be somewhat reduced. However, this will only be noticeable at low jamming levels since at moderate and higher jamming levels the sensitivity will be limited by the jamming, not be receiver noise. Additionally, in this noncoherent mode MTI will not function. Therefore, there will be no MTI in any sector which is being doubly jammed. Unlike the system is not limited in performance by the power ration of the two jammers and will even work for two equal power jammers. This system is also considerably simpler and less expensive than the aforementioned system.

If one or both jammers have AM it will appear on the envelope of the beat and peak detector 22 will follow it. The effective percentage AM will be reduced considerably, however, by the low-pass filter 26 because the filter will typically have a bandwidth on the order of 50 KHz whereas the AM noise typically is concentrated in the band form 1–5 MHz. Therefore, the energy in the low-pass filter band will be primarily that due to beats between the two AM envelopes.

An alternate embodiment of the invention is shown in FIG. 3 of the drawings. Instead of applying the video output directly to the display as described with respect to the embodiment of FIG. 1, the video is translated back to the radar frequency and put through the radar receiver via an output 29. This has some advantages: it requires fewer connections to the radar; it permits putting the signal through the anti-AGC circuit 27 and thereby restoring the proper dynamic range and azimuth resolution; and it permits use of the existing radar signal processing and ECCM features.

As shown in FIG. 3, the translation is accomplished by feeding the video from low-ass filter 26 to a balanced modulator (mixer) 28 where it modulates an r.f. carrier obtained from an oscillator 30. Oscillator 30 is tuned to the radar center frequency.

A mode control 35 operates a diode switch 32 to determine which signal is applied to the receiver via line 29.

A typical peak detector 22 is shown in circuit (A) if FIG. 4 of the drawings comprising a diode 32, shunt capacitor 34 and shunt resistor 36. However, in order to obtain a sufficiently high ratio of discharge to charge time constant several stages are required as shown in circuit (B) of FIG. 4. In this circuit the output of the simplified peak detector of circuit (A) is amplified by an amplifier 38 and includes one or more additional stages here shown as a single stage comprising a diode 40 and shunt capacitor and resistor 42 and 44, respectively. Enhancement of the difference between the signal pulse and noise fluctuation is achieved by providing long time constant a.c. coupling between the stages. This is illustrated by the circuit (C) of FIG. 4 by capacitor 46 and resistor 48. Further improvement in any of the peak detector circuits described is achieved by the use of compound detector loads as shown in circuit (D) of FIG. 4. In this circuit a high impedance high time constant load is placed in series with the normal load to absorb slow variations and levels, leaving only the fast variations (signal pulses) to be passed on to the next stage. In circuit (D) of FIG. 4 resistor 50 should be made of higher value than resistor 52 and the time constant of the combination of resistor 50 and capacitor 54 should be very much larger than that of the combination of resistor 52 and capacitor 56. These peak detectors of FIG. 4 are only illustrative of typical peak detector and are not intended to be exhaustive thereof.

While I have described above the principles of my invention in connection with specific apparatus, it is to be clearly understood that the specification is presented by way of example only and not as a limitation of the scope of my invention as set forth in the accompanying claims.

I claim:

1. Apparatus for recovering desired signals from an input signal which includes noise jamming signals, comprising:
   a balanced modulator;
   means for applying a portion of the input signal to one input of said balanced modulator;
   an AM detector coupled to the input signal;
   means for coupling the output of said AM detector to a second input of said balanced modulator;
   a peak detector coupled to said AM detector;
   means providing a first output coupled to said balanced modulator;
   means providing a second output coupled to said peak detector; and
   means for ascertaining whether the input signal either includes only one jamming signal or more than one jamming signal and for enabling said second output providing means only if more than one jamming signal is present.

2. Apparatus as defined in claim 1, further including a low-pass filter coupling said peak detector to said means providing for a second output.

3. Apparatus as defined in claim 2 wherein said ascertaining means includes means for detecting if the output of said peak detector exceeds a predetermined threshold indicating presence of two jamming signals.

4. Apparatus as defined in claim 1 wherein said peak detector includes plural/stages having amplifiers therebetween.

5. Apparatus as defined in claim 4, wherein said peak detector further includes high-pass filters separating said plural stages.

6. Apparatus as defined in claim 1, wherein said peak detector includes a diode and compound load.

7. Apparatus for recovering desired signals from an input signal which includes noise jamming signals, comprising:
   a balanced modulator;
   means for applying a portion of the input signal to one input of said balanced modulator;
   an AM detector coupled to the input signal;
   means for coupling the output of said AM detector to a second input of said balanced modulator;
   a peak detector coupled to said AM detector;
   an output; and
   means coupling either said balanced modulator or said peak detector to said output, said balanced modulator being coupled to said output when only one jamming signal is present and said peak detector being coupled to said output only when more than one jamming signal is present.

8. Apparatus as defined in claim 7, further including means for ascertaining whether the input signal includes only one jamming signal or more than one jamming signal and for enabling said peak detector to be coupled to said output only if more than one jamming signal is present.

9. Apparatus as defined in claim 8, further including a low-pass filter coupling said peak detector to said output coupling means.

10. Apparatus as defined in claim 9 wherein said ascertaining means includes means for detecting if the output of said peak detector exceeds a predetermined threshold indicating presence of two jamming signals.

11. Apparatus as defined in claim 8, further including means for frequency translating the output of the peak detector coupling said peak detector to said output coupling means.

12. Apparatus as defined in claim 11 wherein said translating means includes a mixer coupled to said peak detector and an oscillator coupled to said mixer.

* * * * *